April 6, 1943.  E. M. TRUEDSON  2,315,911
LAWN SPRINKLER
Filed Feb. 21, 1942
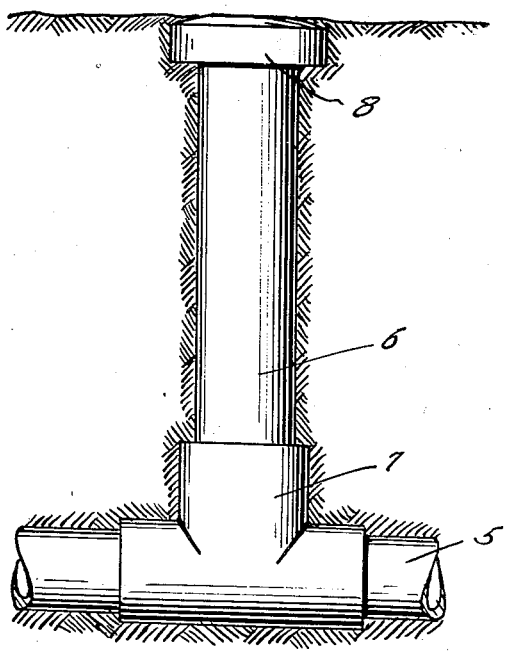
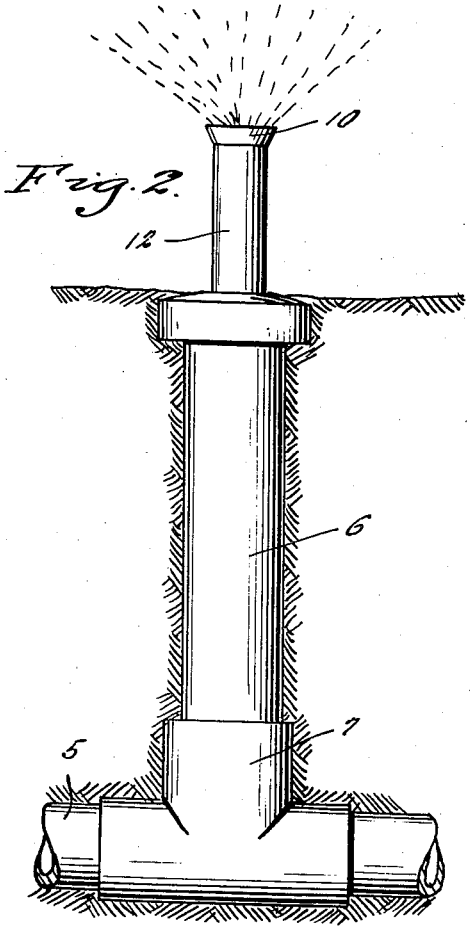
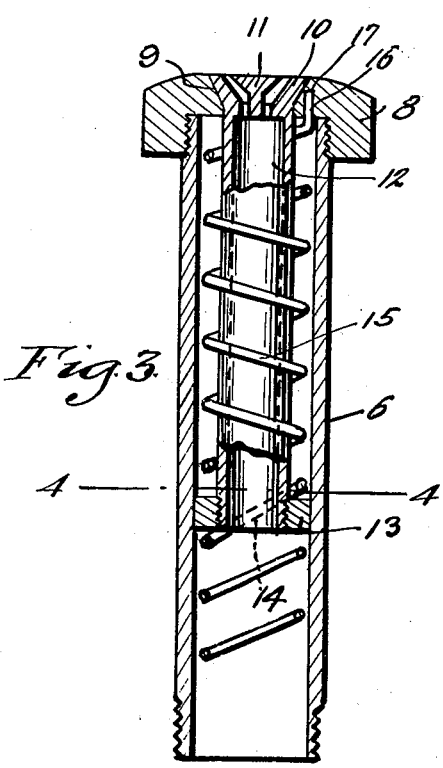
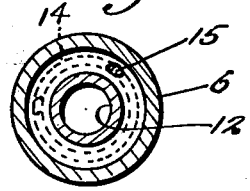
Inventor
Edward M. Truedson
By Clarence A. O'Brien
and Harvey B. Jacobson
Attorneys Patented Apr. 6, 1943

2,315,911

UNITED STATES PATENT OFFICE 2,315,911

LAWN SPRINKLER

Edward M. Truedson, Inglewood, Calif.

Application February 21, 1942, Serial No. 431,867

2 Claims. (Cl. 299—61)

The present invention relates to new and useful improvements in lawn sprinklers of a type wherein the sprinkler nozzle is embedded in the lawn below the surface thereof and adapted to project upwardly by pressure of water entering the nozzle from the supply pipe, and the invention has for its primary object to provide spring means for retracting the nozzle and novel means for adjusting the tension of the spring means.

A further object is to provide a device of this character of simple and practical construction, which is efficient and reliable in performance, relatively inexpensive to manufacture and install in operation, and otherwise well adapted for the purposes for which the same is intended.

Other objects and advantages reside in the details of construction and operation as more fully hereinafter described and claimed, reference being had to the accompanying drawing forming part hereof, wherein like reference numerals refer to like parts throughout, and in which:

Figure 1 is a side elevational view showing the sprinkler nozzle in retracted position.

Figure 2 is a similar view showing the nozzle in upwardly projected position.

Figure 3 is a vertical sectional view, and

Figure 4 is a transverse sectional view taken substantially on a line 4—4 of Figure 3.

Referring now to the drawing in detail, the numeral 5 designates the supply pipe embedded in the ground to which the sprinkler pipes 6 are attached at spaced intervals by T-fittings 7, the sprinkler pipes extending upwardly and terminating substantially in the plane of the surface of the ground.

A cap 8 is threaded on the upper end of the pipe 6 having a flared opening 9 within which is seated the flared head 10 of the nozzle 11. The nozzle includes the hollow stem 12 extending downwardly from the head into the pipe 6 and spaced from the walls thereof.

A collar 13 is threaded on the lower end of the stem 12 having a working fit in the pipe 6 and provided with an inclined opening 14 loosely receiving one of the coils of a coil spring 15 surrounding the stem 12. The upper end 16 of the spring is inserted upwardly into a recess 17 formed in the underside of the cap 8 to anchor the spring and prevent rotation thereof.

In the operation of the device the pressure of water entering the pipe 6 will force the nozzle upwardly into the position shown in Figure 2, placing the spring under tension to retract the nozzle into its lowermost position, as shown in Figure 1, when pressure is relieved. The tension of the spring may be regulated by rotating the nozzle in the pipe 6, the inclined opening 14 in the collar 13 permitting the collar to travel longitudinally of the spring.

It is believed the details of construction and manner of use of the device will be readily understood from the foregoing without further detailed explanation.

Having thus described the invention what I claim is:

1. A lawn sprinkler comprising a supply pipe, a nozzle responsive to pressure of water for projecting the nozzle from the pipe, spring means for retracting the nozzle, means for anchoring one end of the spring to the pipe and a guide carried by the nozzle and having an opening slidably receiving the other end of the spring, the spring having a binding fit in the opening to anchor the spring to the nozzle, said spring being fed through the opening upon a rotary movement of the nozzle relative to the pipe to adjust the tension of the spring.

2. A lawn sprinkler comprising a supply pipe forming a barrel, a nozzle responsive to pressure of water for projecting the nozzle from the pipe, spring means for retracting the nozzle, and a combined plunger and guide carried by the nozzle and having an opening slidably receiving one end of the spring, said guide having a working fit in the pipe, the spring having a binding fit in the opening to anchor the spring to the nozzle, said spring being fed through the opening upon a rotary movement of the nozzle relative to the pipe to adjust the tension of the spring, and means for anchoring the other end of the spring to the pipe.

EDWARD M. TRUEDSON.